United States Patent [19]
Olivadoti

[11] Patent Number: 6,059,247
[45] Date of Patent: May 9, 2000

[54] RETAINING APPARATUS FOR PET WASTE PAD

[76] Inventor: Rick Olivadoti, 290 Riverside Dr., Suite 3C, New York, N.Y. 10025

[21] Appl. No.: 09/154,860

[22] Filed: Sep. 16, 1998

[51] Int. Cl.[7] ............ A47G 29/02; A01K 29/00
[52] U.S. Cl. ............ 248/346.04; 119/161; 119/165
[58] Field of Search ............ 248/346.06, 346.5, 248/510, 346.11, 346.01; 119/165, 166, 171; 40/603, 658; 160/380; 38/102.1, 102.2, 102.91

[56] References Cited

U.S. PATENT DOCUMENTS

| | | | |
|---|---|---|---|
| 229,436 | 6/1880 | Mallett, Jr. | 428/76 |
| 2,989,205 | 6/1961 | Yaws | 248/346.11 |
| 3,268,198 | 8/1966 | Swett | 248/346.11 |
| 3,284,273 | 11/1966 | Prentice | 4/459 |
| 3,626,899 | 12/1971 | Spellman | 119/169 |
| 3,745,975 | 7/1973 | Prucha | 119/165 |
| 3,752,121 | 8/1973 | Brazzell | 119/169 |
| 3,826,229 | 7/1974 | Classe et al. | 119/453 |
| 4,640,225 | 2/1987 | Yananton | 119/169 |
| 4,715,320 | 12/1987 | Barnhart | 119/169 |
| 4,771,731 | 9/1988 | Derx et al. | 119/166 |
| 4,800,677 | 1/1989 | Mack | 119/1 |
| 4,869,204 | 9/1989 | Yananton | 119/166 |
| 4,949,673 | 8/1990 | Yamamoto | 119/169 |
| 5,168,834 | 12/1992 | Burschur | 119/166 |
| 5,355,837 | 10/1994 | Reyes | 119/161 |
| 5,410,987 | 5/1995 | Simmons | 119/166 |
| 5,515,812 | 5/1996 | Faust | 119/166 |
| 5,555,844 | 9/1996 | Kolomeyer | 119/165 |
| 5,564,366 | 10/1996 | Hancock | 119/167 |
| 5,630,376 | 5/1997 | Ochi et al. | 119/169 |
| 5,699,754 | 12/1997 | Cahajla | 119/166 |
| 5,701,844 | 12/1997 | Murphy | 119/166 |

*Primary Examiner*—Anita M. King
*Assistant Examiner*—Michael Nornberg
*Attorney, Agent, or Firm*—Fitzpatrick, Cella, Harper & Scinto

[57] ABSTRACT

An apparatus for retaining a liquid-absorptive sheet or pad for collecting pet wastes includes a base member and a securing member. The base member has a bottom layer and a continuous upstanding wall, which define a reservoir. The securing member includes an upper surface and two depending legs for receiving the upstanding wall of the base member. The two depending legs are flexible in directions toward and away from one another so as to form a compression fit between the base member and the securing member. The absorptive sheet is removably secured at its periphery between the base member and the securing member at least at three peripheral areas of pressure contact.

19 Claims, 2 Drawing Sheets

6,059,247

RETAINING APPARATUS FOR PET WASTE PAD

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to an apparatus for securely retaining absorbent sheets or pads for use in collecting and disposing of pet wastes. In particular, the present invention relates to a device for securely retaining a disposable, absorbent sheet in a leakproof reservoir.

2. Description of Related Art

Many devices have been proposed to aid in housebreaking of pets and, in particular, dogs. When indoors, it is desirable for the pets to urinate and defecate at a single, predetermined location. Several methods and devices have been proposed to provide a disposable waste collector at the predetermined location.

Traditionally, newspapers have been laid on the floor for a dog's use. Although newspapers are absorbent, unrestrained newspapers can easily scatter when exposed to drafts or can be scattered or torn by a playful or destructive animal. Another drawback of newspapers is that they readily leak through to the floor surface upon which they are laid.

To eliminate the leaking problem, several absorbent pads have been proposed. U.S. Pat. Nos. 3,626,899; 4,800,677; and 5,630,376 all describe collection pads including at least one layer of absorbent material and a backing layer of material that is impervious to fluid so as to preclude urine from leaking through the pad to the surface of the floor. However, although these devices can preclude fluid leakage, when unrestrained, they, too, can be readily scattered or torn by drafts or pets.

U.S. Pat. No. 4,949,673 proposes a chamber pot for pets in which a water-absorptive sheet can be laid over a soil bed surrounded by peripheral walls. The water-absorptive sheet is drawn out of a roll, cut and laid on the soil bed. A presser frame hinged to the soil bed is then lowered and engaged with a locking device. The bottom face of the presser frame presses and clamps the periphery of the sheet placed on the soil bed. However, the chamber pot requires a complicated structure in order to retain the absorptive sheet in a tray. This can lead to higher costs and a complicated manufacturing process. Further, because there is only a single line of peripheral contact between the presser frame and the periphery of the absorptive sheet, a pet can readily dislodge the absorptive sheet from the frame.

U.S. Pat. No. 4,715,320 relates to a sanitary receptacle for animal waste that is formed of three concentric hoops and a sheet of thin flexible material, such as newspaper. The newspaper is spread over the inner hoop and then captured in an annular space between the inner and center hoops when the center hoop is placed over the inner hoop. This assembly is then inverted and the outer hoop is pushed over the newspaper and the center hoop, thereby capturing the newspaper between the center and outer hoops. However, in this device nothing is disposed between the newspaper and the floor, so animal waste can leak through to the floor surface. Further, assembly of the device is complex, requiring multiple steps to secure the newspaper within the three hoops.

BRIEF SUMMARY OF THE INVENTION

It is, therefore, an object of the present invention to provide a leakproof apparatus for securely and reliably retaining a disposable, absorptive sheet for receiving pet waste matter.

It is another object of the present invention to provide a low-cost apparatus of simple design and ease of manufacture for securely retaining such disposable, absorptive sheets.

It is still another object of the present invention to provide an easily-assembled apparatus for securely retaining such disposable, absorptive sheets.

It is yet another object of the present invention to provide a device for securely retaining such disposable, absorptive sheets and for preventing the sheets from being dislodged or damaged by the pet.

In accordance with one aspect of the present invention, an apparatus for retaining a liquid-absorptive sheet includes a base member and a securing member. The base member has a bottom layer and a continuous upstanding wall, with the bottom layer and the upstanding wall defining a reservoir. The securing member includes an upper surface and two depending legs for receiving the upstanding wall of the base member. The two depending legs are flexible in directions toward and away from one another so as to form a compression fit between the base member and the securing member. The absorptive sheet is removably secured at its periphery between the base member and the securing member.

According to another aspect of the present invention, an apparatus for retaining a liquid-absorptive sheet includes base means and securing means. The base means receives the absorptive sheet and the securing means secures the absorptive sheet between the base means and the securing means. The securing means establishes at least one area of peripheral pressure contact along the periphery of the absorptive sheet.

According to yet another aspect of the present invention, the base means of an apparatus for retaining a liquid-absorptive sheet receives the absorptive sheet, while the securing means engages the base means and secures the absorptive sheet between the base means and the securing means. The securing means includes an upper surface and two depending legs, with the two depending legs being flexible in directions toward and away from one another so as to form a compression fit between the base means and the securing means. The absorptive sheet is removably secured at its periphery between the base means and the securing means.

According to still another aspect of the present invention, an apparatus for retaining a liquid-absorptive sheet includes a base member for receiving the absorptive sheet and a securing member. The base member includes an upstanding wall along its periphery. The securing member includes a recessed wall for receiving the upstanding wall of the base member and secures the absorptive sheet between the securing member and the base member. The securing member establishes at least one area of peripheral pressure contact along the periphery of the absorptive sheet.

The above, and other objects, features and advantages of the present invention will be apparent from the following detailed description of illustrative embodiments thereof, which is to be read in connection with the accompanying drawings wherein:

DETAILED DESCRIPTION OF THE DRAWINGS

Figure 1:
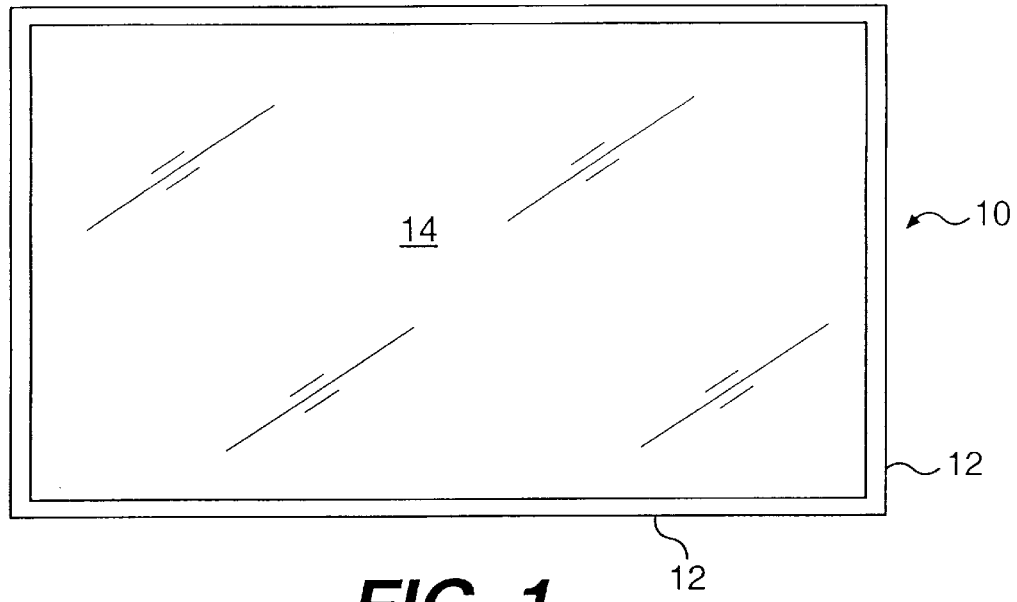
FIG. 1 is a plan view of the base member of the retaining apparatus of one embodiment of the present invention.
Figure 2:
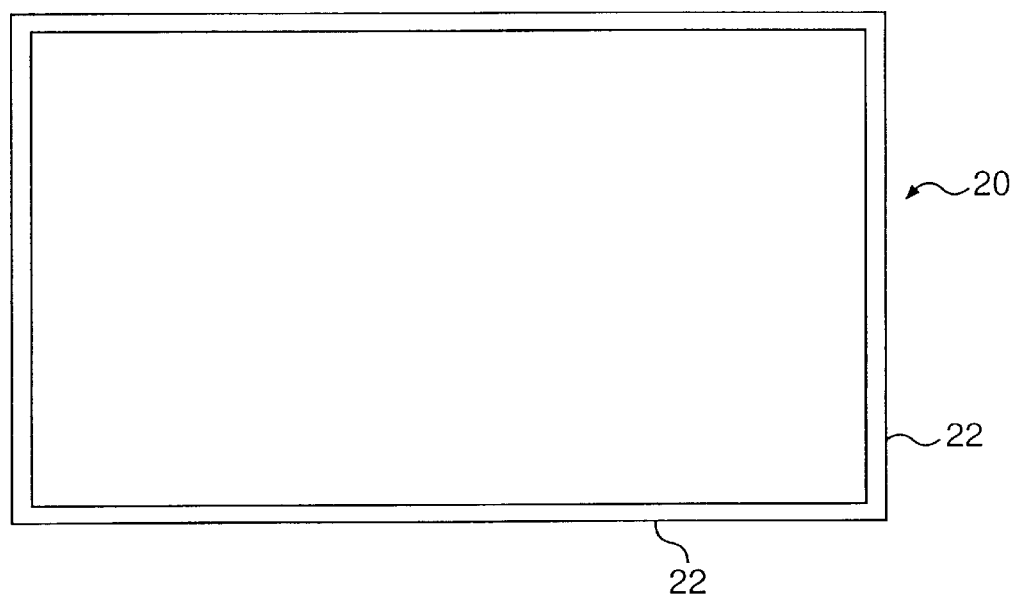
FIG. 2 is a plan view of the retaining frame of the retaining apparatus of one embodiment of the present invention.
Figure 3:
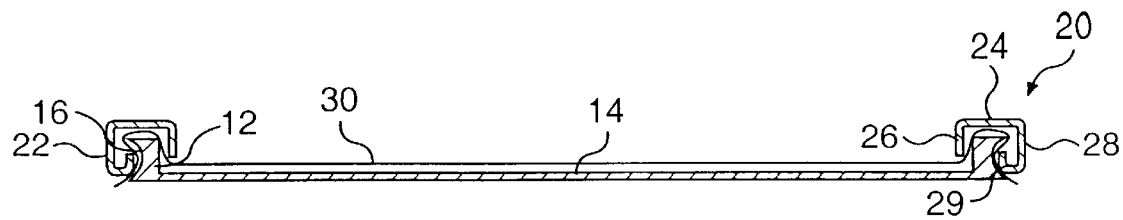
FIG. 3 is a cross-sectional view of the assembled retaining apparatus of one embodiment of the present invention.
Figure 4:
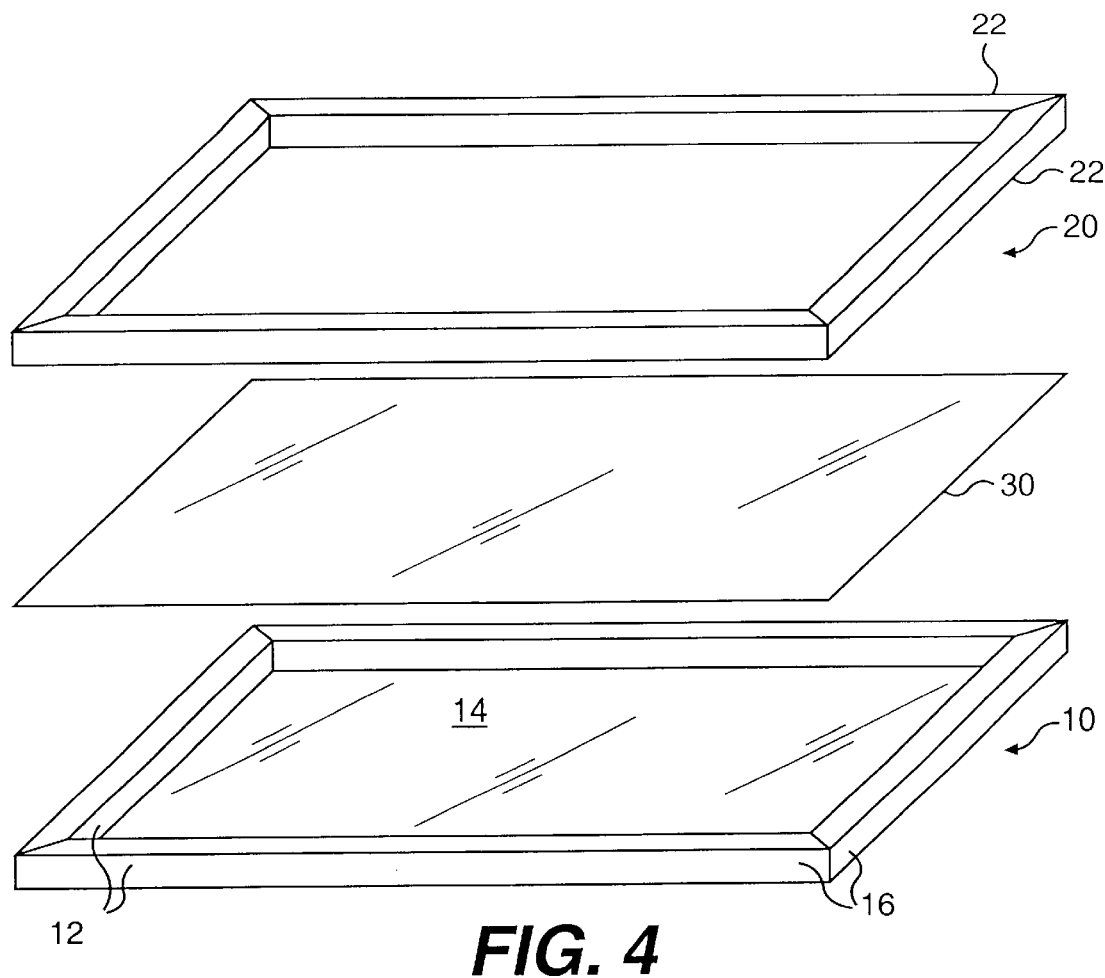
FIG. 4 is an exploded perspective view of the components of the retaining apparatus of one embodiment of the present invention.

Referring to FIGS. 1 through 4, the retaining assembly of the present invention includes a base member 10 and a retaining frame 20 for retaining an absorbent sheet or pad 30. Base member 10 includes four upstanding walls 12 that are connected to a bottom layer 14. Walls 12 and bottom layer 14 form a liquid impermeable reservoir or tray for retaining liquid. The exterior peripheral surfaces 16 of upstanding walls 12 are preferably concave in cross-section as shown in FIG. 3. The concave surfaces 16 aid in securing retaining frame 20 to base member 10, as will become more apparent.

In the preferred embodiment, base member 10 is rectangular, but the present invention is not limited to this particular shape. Any geometric or freeform shape can be used. A rectangular shape is preferred, however, because when newspaper is used as the absorbent material, the retaining assembly can take advantage of the typically rectangular shape of newspaper to efficiently use the entire surface of the newspaper. Also, many disposable absorbent pads on the market for use in collecting animal wastes are also rectangular in shape. Moreover, a rectangular-shaped assembly can be conveniently placed in any corner of a room.

Base member 10 can be formed of any material that is impervious to fluid. Non-porous materials are preferred for sanitary reasons because they can be easily cleaned. Preferably, the base member is formed of plastic with walls 12 and bottom layer 14 being integrally formed. If desired, an anti-skid material can be placed on the bottom surface of base member 10 to keep it from sliding across the floor. Also, the upper surface of bottom layer 14 can be textured, so the pet will not slip.

The dimensions of the retaining assembly are not limited. In the preferred embodiment, the base member is 17.5×19.5 inches, and upstanding walls 12 are about 1 inch high. It has been found that this particular size can comfortably accommodate puppies of average size and smaller adult dogs, such as those of the toy group or under about 20 pounds.

Retaining frame 20 is of a shape similar to bottom tray 10, namely, rectangular in the preferred embodiment. Retaining frame 20 is also of substantially the same size as the base member 10. In the preferred embodiment, retaining frame 20 includes four sides 22. As shown more clearly in FIG. 3, each side 22 has an identical cross-section with an upper surface 24 and two legs depending therefrom, an interior depending leg 26 and an exterior depending leg 28. Thus, the cross-section of each side of retaining frame 20 is substantially C-shaped.

The C-shaped design of retaining frame 20 is sized to receive walls 12 of base member 10 in a compression fit. In particular, the distance between interior leg 26 and exterior leg 28 should be approximately equal to or slightly less than the width of wall 12 of base member 10. Thus, when retaining frame 20 is pressed into engagement with base member 10, the compression fit will be established between legs 26, 28 of the sides 22 of retaining frame 20 and walls 12 of base member 10.

Preferably, retaining frame 20 is formed of a flexible material, thereby enabling legs 26, 28 to resiliently engage walls 12. For example, retaining frame 20 can be formed of a plastic material similar to that forming base member 10. Exterior leg 28 can include a compression lip 29 at its free end for defining a rigid line of contact between exterior legs 28 of sides 22 of retaining frame 20 and the exterior surfaces of walls 12 of base member 10. Compression lip 29 also can seat in the center of the concave surfaces 16 of upstanding walls 12 of base member 10 so as to lock retaining frame 20 onto base member 10.

When retaining frame 20 is secured onto base member 10, several areas of peripheral pressure contact are established. Each area of peripheral pressure contact applies substantially equal pressure along a linear area, substantially along the entire periphery of base member 10. In particular, four areas of peripheral pressure contact can be established between the edges of interior legs 26 and bottom layer 14, between the inside surfaces of legs 26 and interior sides of walls 12, between the underside of upper surfaces 24 and the top surfaces of walls 12 and between compression lip 29 and the outer concave surfaces 16 of walls 12.

The retaining assembly of the present invention can be used to retain any type of absorbent sheet materials 30, including newspapers and well-known waste collection pads, such as pads marketed under the tradename WEE-WEE PADS. The absorbent sheets or pads can be applied with a scent attractive to dogs to encourage use of the assembly or contain material for absorbing the odors from pet waste.

In assembling the retaining apparatus of the present invention, base member 10 is first laid on the floor. Absorbent sheet 30, such as newspaper or a waste collection pad, is laid on base member 10 such that the periphery of the absorbent sheet or pad 30 overlies walls 12 equally. That is, the absorbent sheet or pad is centered on base member 10. Retaining frame 20 is then aligned with base member 10, with absorptive sheet or pad 30 disposed therebetween, and firmly pressed along its periphery to engage legs 26, 28 with walls 12 of base member 10.

When base member 10 and retaining frame 20 are attached, absorbent sheet or pad 30 is forced into the shape shown more clearly in FIG. 3. In particular, the central portion of the absorbent sheet or pad is forced against bottom layer 14 of base member 10 in a substantially flat manner by the free edges of interior legs 26 of retaining frame 20. The perimeter of the absorbent sheet or pad 30 is securely trapped between walls 12 of base member 10 and retaining frame 20 at the multiple areas of peripheral pressure contact. By establishing multiple peripheral areas of pressure contact, namely, four in the preferred embodiment, absorbent sheet or pad 30 is securely retained within the retaining assembly of the present invention.

The assembled retaining assembly is positioned at a predetermined location in a room. The pet is then encouraged to walk onto the retaining assembly and relieve itself on the absorbent pad. Although all waste liquids are intended to be absorbed by the absorbent sheet or pad, any leakage that may occur will be retained by the reservoir of base member 10 and not soil the floor. To remove a soiled absorbent sheet or pad, base member 10 is grasped and retaining frame 20 is pulled off of the base member. The soiled sheet can then be lifted off of base member 10 and discarded, and a fresh sheet mounted in its place.

Figure 5:
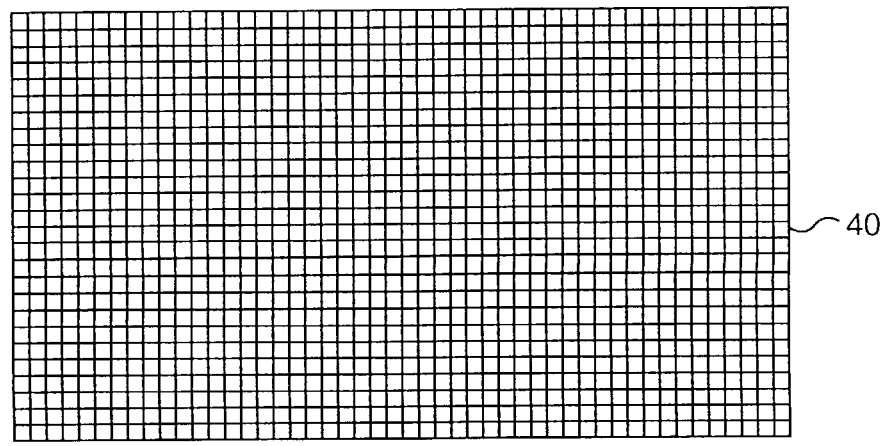
FIG. 5 is a plan view of the grid accessory of the retaining apparatus of one embodiment of the present invention.

If the absorbent sheets or pads 30 are left exposed on the retaining assembly, the pet may tear the material with its claws or teeth. Placing a grate within the retaining assembly and over the absorbent sheet or pad can protect the sheet or pad, but its uneven surface may discourage the pet from standing on and utilizing the assembly. Accordingly, another feature of the present invention is to provide a thin, flexible protective grid or mesh 40, as shown in FIG. 5, for placement over absorbent sheets or pads 30. Preferably, protective grid 40 is formed of a material durable enough to withstand scratching by a pet's claws, yet sufficiently soft or thin as not to be uncomfortable to a pet standing thereon. Examples of such materials include nylons, Teflon® or thin yet strong metallic mesh. Protective grid 40 is preferably of the same size as absorbent sheets or pads 30 and can be placed over an absorbent sheet or pad before retaining frame 20 is positioned over base member 10. Thus, protective grid 40 can be retained in the retaining assembly in the same manner as the absorbent sheets or pads 30. Although protective grid 40 is intended to be reused and cleaned when desired, if worn out it can also be disposed of along with a soiled absorbent sheet or pad.

Although illustrative embodiments of the present invention have been described herein in connection with the accompanying drawings, it is to be understood that this invention is not limited to these embodiments and that various changes and modifications may be effected therein by those skilled in the art without departing from the spirit of the invention.

I claim:

1. An apparatus comprising:

a liquid absorptive sheet;

a base member having a bottom layer and a continuous upstanding wall, said bottom layer and said upstanding wall defining a reservoir, said upstanding wall having an interior vertical side and an exterior vertical side connected by an upper wall; and a securing member comprising an upper surface, an interior depending leg, and an exterior depending leg for receiving said upstanding wall of said base member, said interior and exterior depending legs being flexible in directions toward and away from one another so as to form a compression fit between said base member and said securing member, said absorptive sheet being removably secured at its periphery between said base member and said securing member, wherein said securing member and said base member establish at least four areas of peripheral pressure contact along the periphery of said absorptive sheet, a first area of peripheral pressure contact being defined by said securing member forcing said absorptive sheet against said bottom layer of said base member to hold said absorptive sheet flat against said bottom layer of said base member, and second and third areas of peripheral pressure contact being defined by said absorptive sheet being sandwiched at areas between said interior vertical side and said interior depending leg and between said exterior vertical side and said exterior vertical leg.

2. An apparatus according to claim 1, wherein the perimeters of said base member and said securing member are rectangular.

3. An apparatus according to claim 1, further comprising a flexible protective grid secured between said base member and said securing member on the absorptive sheet.

4. An apparatus according to claim 1, wherein said exterior depending leg includes a compression lip at its lower edge, said compression lip projecting toward said interior depending leg and defining a line of contact along the perimeter of the absorptive sheet.

5. An apparatus according to claim 1, wherein a fourth area of peripheral pressure contact is established between said upper wall of said upstanding wall of said base member and said upper surface of said securing member.

6. An apparatus for retaining a liquid-absorptive sheet, said apparatus comprising:

base means for receiving the absorptive sheet, said base means comprising a bottom layer; and securing means for securing the absorptive sheet between said base means and said securing means, said securing means and said base means establishing at least four areas of peripheral pressure contact along the periphery of the absorptive sheet, with one area of the at least four areas of peripheral pressure contact being between said securing means and said bottom layer of said base means to hold the absorptive sheet flat against said bottom layer.

7. An apparatus according to claim 6, wherein said base means defines a reservoir for retaining fluid.

8. An apparatus according to claim 6, wherein the perimeters of said base means and said securing means are rectangular.

9. An apparatus according to claim 6, further comprising a flexible protective grid secured between said base means and said securing means on the absorptive sheet.

10. An apparatus comprising:

a liquid absorptive sheet;

base means for receiving said absorptive sheet, said base means comprising a bottom layer and a continuous upstanding wall, said bottom layer and said upstanding wall defining a reservoir, said upstanding wall having an interior vertical side and an exterior vertical side connected by an upper wall; and securing means for engaging said base means and securing said absorptive sheet between said base means and said securing means, said securing means comprising an upper surface, an interior depending leg, and an exterior depending leg, said interior and exterior depending legs being flexible in directions toward and away from one another so as to form a compression fit between said base means and said securing means, said absorptive sheet being removably secured at its periphery between said base means and said securing means, wherein said securing means and said base means establish at least four areas of peripheral pressure contact along the periphery of said absorptive sheet, a first area of peripheral pressure contact being defined by said securing means forcing said absorptive sheet against said bottom layer of said base means to hold said absorptive sheet flat against said bottom layer of said base means, and second and third areas of peripheral pressure contact being defined by said absorptive sheet being sandwiched at areas between said interior vertical side and said interior depending leg and between said exterior vertical side and said exterior vertical leg.

11. An apparatus according to claim 10, wherein said base means defines a reservoir.

12. An apparatus according to claim 10, wherein the perimeters of said base means and said securing means are rectangular.

13. An apparatus according to claim 10, further comprising a flexible protective grid secured between said base means and said securing means on the absorbent sheet.

14. An apparatus comprising:

a liquid-absorptive sheet;

a base member for receiving said absorptive sheet, said base member including a bottom layer and an upstanding wall along its periphery; and a securing member including a recessed wall for receiving said upstanding wall of said base member and securing said absorptive sheet between said securing member and said base member, said securing member and said base member establishing at least four areas of peripheral pressure contact along the periphery of said absorptive sheet, with one area of the at least four areas of peripheral pressure contact being between said securing member and said bottom layer of said base member to hold said absorptive sheet flat against said bottom layer.

15. An apparatus according to claim 14, wherein said securing member establishes at least three areas of peripheral pressure contact along the periphery of the absorptive sheet.

16. An apparatus according to claim 14, wherein said bottom layer cooperates with said upstanding wall to define a reservoir for retaining fluid.

17. An apparatus according to claim 16, wherein said securing member holds the absorptive sheet flat against said bottom layer of said base member.

18. An apparatus according to claim 14, wherein the perimeters of said base member and said securing member are rectangular.

19. An apparatus according to claim 14, further comprising a flexible protective grid secured between said base member and said securing member on the absorbent sheet.

* * * * *

UNITED STATES PATENT AND TRADEMARK OFFICE
CERTIFICATE OF CORRECTION

PATENT NO. : 6,059,247
DATED : May 9, 2000
INVENTOR(S) : Olivadoti

It is certified that error appears in the above-identified patent and that said Letters Patent is hereby corrected as shown below:

Column 8:
Lines 4-7, Claim 15 should be deleted in its entirety.
Lines 11-13, Claim 17 should be deleted in its entirety.

Signed and Sealed this

Twenty-eighth Day of August, 2001

Attest:

*Nicholas P. Godici*

NICHOLAS P. GODICI
*Attesting Officer*         *Acting Director of the United States Patent and Trademark Office*